United States Patent [19]

Le Can

[11] 3,927,396

[45] Dec. 16, 1975

[54] STORAGE DEVICE WITH ROW FLAG ELEMENTS FOR ROW SCANNING

[75] Inventor: Claude Jan Principe Frederic Le Can, Nijmegen, Netherlands

[73] Assignee: U.S. Philips Corporation, New York, N.Y.

[22] Filed: Sept. 27, 1974

[21] Appl. No.: 509,782

[30] Foreign Application Priority Data

Oct. 3, 1973 Netherlands ........................ 7313573

[52] U.S. Cl. ... 340/173 R; 340/172.5; 340/173 AM

[51] Int. Cl.[2] ...................... G11C 8/00; G11C 15/00

[58] Field of Search ..... 340/173 R, 173 AM, 172.5, 340/174 A, 174 GA

[56] References Cited

UNITED STATES PATENTS

| | | | |
|---|---|---|---|
| 3,653,003 | 3/1972 | Hem et al. ........................ | 340/173 R |
| 3,753,244 | 8/1973 | Sumilas et al. ..................... | 340/172.5 |

*Primary Examiner*—Stuart N. Hecker
*Attorney, Agent, or Firm*—Frank R. Trifari; Daniel R. McGlynn

[57] ABSTRACT

A storage device, including a matrix of storage elements arranged in rows and columns, a flag element in each of the rows, a scanning register for scanning the rows to detect the presence of a flag in one of the rows, and a data transfer device for transferring a portion of the information stored in a row in which a flag has been detected.

13 Claims, 10 Drawing Figures

STORAGE DEVICE WITH ROW FLAG ELEMENTS FOR ROW SCANNING

The invention relates to a storage device in which the storage elements are accommodated in a matrix at crosspoints of rows and columns, comprising a scanning register (scanner), the outputs of which are connected to the row conductors and by means of which an indication per row and the information transport in the column direction are effected. A storage device of this kind is notably known for the storage of image information. It is sufficient that the scanner scans one row after the other while writing or reading, respectively, the information into and from the relevant rows. This is a continuous process, in which always an up-to-date image is produced. Particularly in digital techniques, in which 0 or 1 bits are stored per storage element of the matrix, it is often desirable for the storage and the further processing of the information that the information is arbitrarily accessible in a matrix row to be selected at random. In a matrix-organized store this is normally effected by means of an address-decoder selection-device which, however, is rather complex, particularly in the case of a large matrix. Now the integration techniques have reached a stage in which matrices comprises many storage elements can be realized, it was found to be desirable to minimize the integration surface used for selection purposes. This possibility is offered by the use of a scanner. This may be a simple integrated shift register, for example, a bucket brigade which requires very little surface area. In the scanning shift register a 1-value is shifted through the register in which there are further only 0-values present. The scan position is thus determined by the position of the said 1-value. However, the said scanner offer only the possibility of scanning the matrix one row after the other. In order to have the possibility of distinguishing one row from other rows during scanning on a random basis, the storage device according to the invention is characterized in that in the matrix at least one storage element is present per row for the storage of at least one indicator (flag) which originates from outside the storage device and which serves to stop the scanner when it indicates a row with which the said indicator in associated, and to effect the information transport for the storage elements of the row (word), further means being provided for changing the indicator as desired in reaction to a command originating outside the storage device and for advancing the scanner. It is thus achieved that the scanner can be stopped at any arbitrary location, i.e. on the basis of flag information associated with a relevant row. The major advantage thereof is that the indicator can be changed as desired, so that the stopping of the scanner at each time different desired locations is possible. The indicator associated with a row is then always present in the storage device itself. For example, preferably at least a number of storage elements in a column of the matrix will be reserved for the storage of an indicator, or a number of storage elements of a row of the matrix will preferably be reserved for the storage of an indicator. The scanner can thus be used for a plurality of scanning purposes, particularly within a large-scale integrated unit, without an indicator first having to be separately saved. The indicator has its own space and can always be found back. This will be immediately obvious in a storage device according to the invention which is characterized in that at least two separate storage sections are present in the row direction, for the benefit of at least one storage section at least one storage element being provided per row in the matrix of the section for the storage of at least one indicator (flag), which originates outside the storage device and which serves to stop the scanner when it indicates a row with which an indicator is associated, and to provide the information transport of the storage elements of the row in as far as this row extends within a relevent storage section (section word) and within a storage section for which no indicator storage means are provided, further means being provided for changing the indicator per storage section as desired in reaction to a command originating outside the storage device and for advancing the scanner. The same scanner thus serves a number of storage sections. The indicators provide the desired information transport from/to the selected section words of the store.

In given cases there will in this set-up be the need for displacing an indicator within the store or, in the case of a plurality of storage sections, for displacing the indicators in the storage sections from row to row, so that each time a successive (section) word is selected during the interrogation (with or without intervals) of the store and/or sections thereof. In order to realize this, the storage device according to the invention is characterized in that means are provided by means of which, after the stopping of the scanner, the indicator (flag) of the relevant section word can be erased and by means of which the scanner can be displaced one step, the indicator being assignable to the next section word thus indicated. The major advantage thereof is that the scanner, even it has been used in the meantime for scanning a different (storage) section so that it no longer knows where it was previously situated, it still automatically finds the position where it was previously located.

It appears from the foregoing that, using a matrix construction of the storage device according to the invention, the information transport within the storage device from/to the various sections and between the sections themselves is possible with the aid of the scanner and the indicators, without the matrix construction being disturbed. The matrix pattern constitutes the basis of the whole set-up as consistently as possible. The matrix is filled in as if it were so that many additional connections between all sorts of parts of the device can be dispensed with. The set-up according to the invention can be used to good advantage particularly in storage devices constructed according to the integrated circuit technique. A semiconductor body comprising such a matrix structure in which the storage sections all fit on the matrix structure and can still be independently used at random is very attractive in practice.

According to the invention it is even possible for the storage sections to be sections of a different kind (for example, read-write, read-only, key-board). In this case it is advantageous if a comparison device is provided by means of which the contents of a section word selected from one of the storage sections can be compared with successive section words from a different storage section, the scanner being stopped in the case of equality. In this case the said other storage section will preferably be a read-only store. Moreover, this read-only store does not require the use of an indicator.

An arrangement of different kinds of storage section within the matrix structure of the storage device according to the invention which is very practical is characterized in that there are provided, in addition to at least one read-write storage section comprising means for storing an indicator, two read-only storage sections without means for storing an indicator, in which section words on one and the same row contain different codes of the same quantity, and in which, if equality between a section word of the read-write storage section and a section word of a first of the read-only storage sections is detected in the comparison device, the corresponding code section word of the second of the read-only storage sections appears on an output (code conversion).

A further arrangement which is very suitable in practice is characterized in that one of the storage sections is a keyboard, the keys being arranged according to a column, each key being connected to a row of the matrix, an indicator (flag) being present on the relevant row when a key is closed, the indicator being detectable via column when the said row is indicated by the scanner.

In all described arrangements it is furthermore possible for the scanner to be subdivided into a number of sub-scanners in the column direction, each sub-scanner being associated with at least one storage section, further means being provided which prevent the outputs of the sub-scanners which are in the rest state from being connected to the relevant rows. The transport possibilities within the frame-work of the matrix set-up are thus further extended yet.

If there is sufficient space in the case of a construction according to an integrated solid-state body, it is advantageous in practice to provide a plurality of these storage devices instead of a described storage device comprising a scanner or a number of sub-scanners. Within such a solid-state device scanners (sub-scanners) can then be independently active, with the result that a plurality of scanning actions and information transport movements can simultaneously take place.

The described and further aspects of the storage device according to the invention will be described in detail hereinafter with reference to the drawing.

Figure 5A:
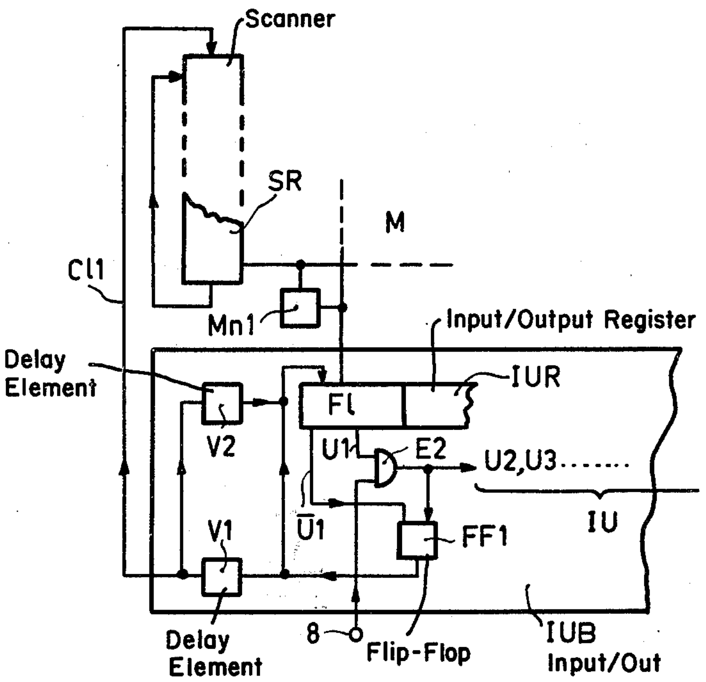
Figure 5B:
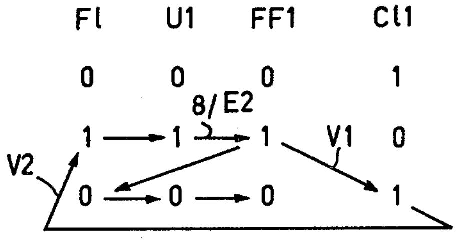

FIGS. 5*a* and 5*b* show means and the associated procedure for changing an indicator in a given manner.

Figure 6:
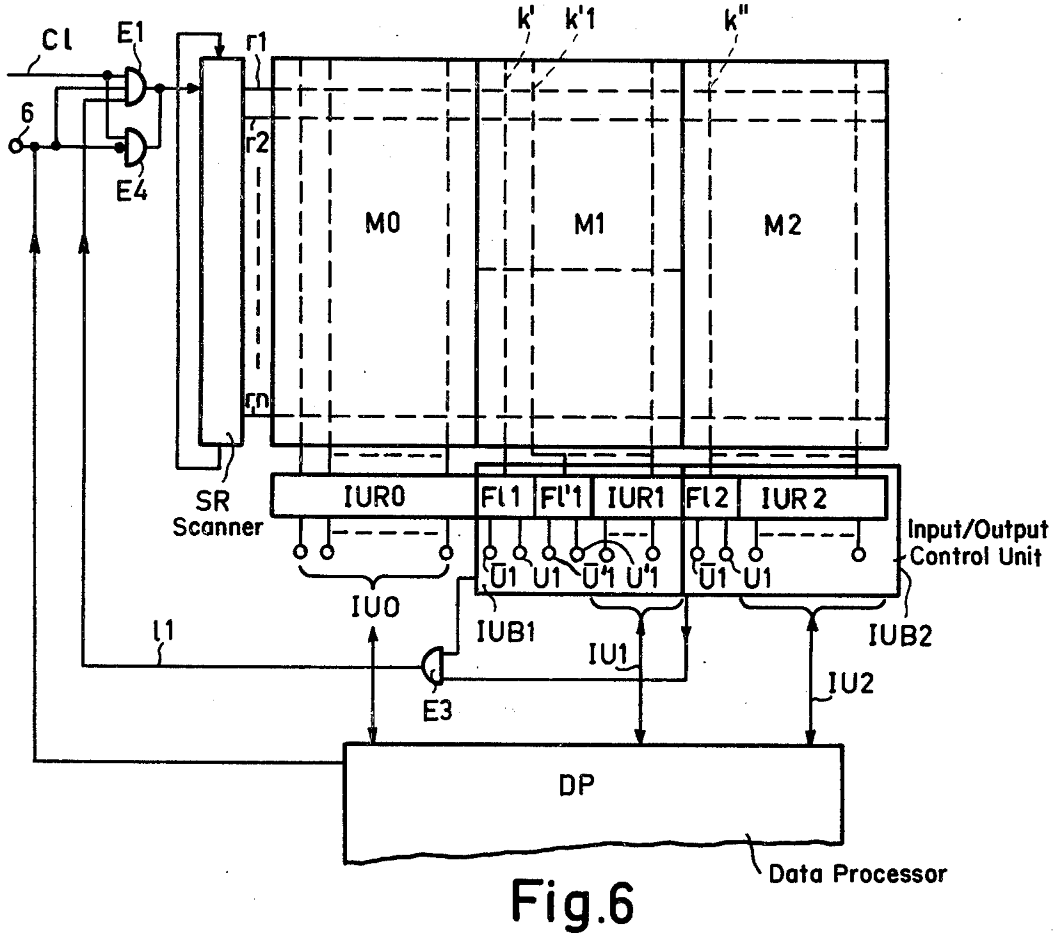

FIG. 6 shows a storage device according to the invention, comprising a plurality of storage sections.

Figure 7:
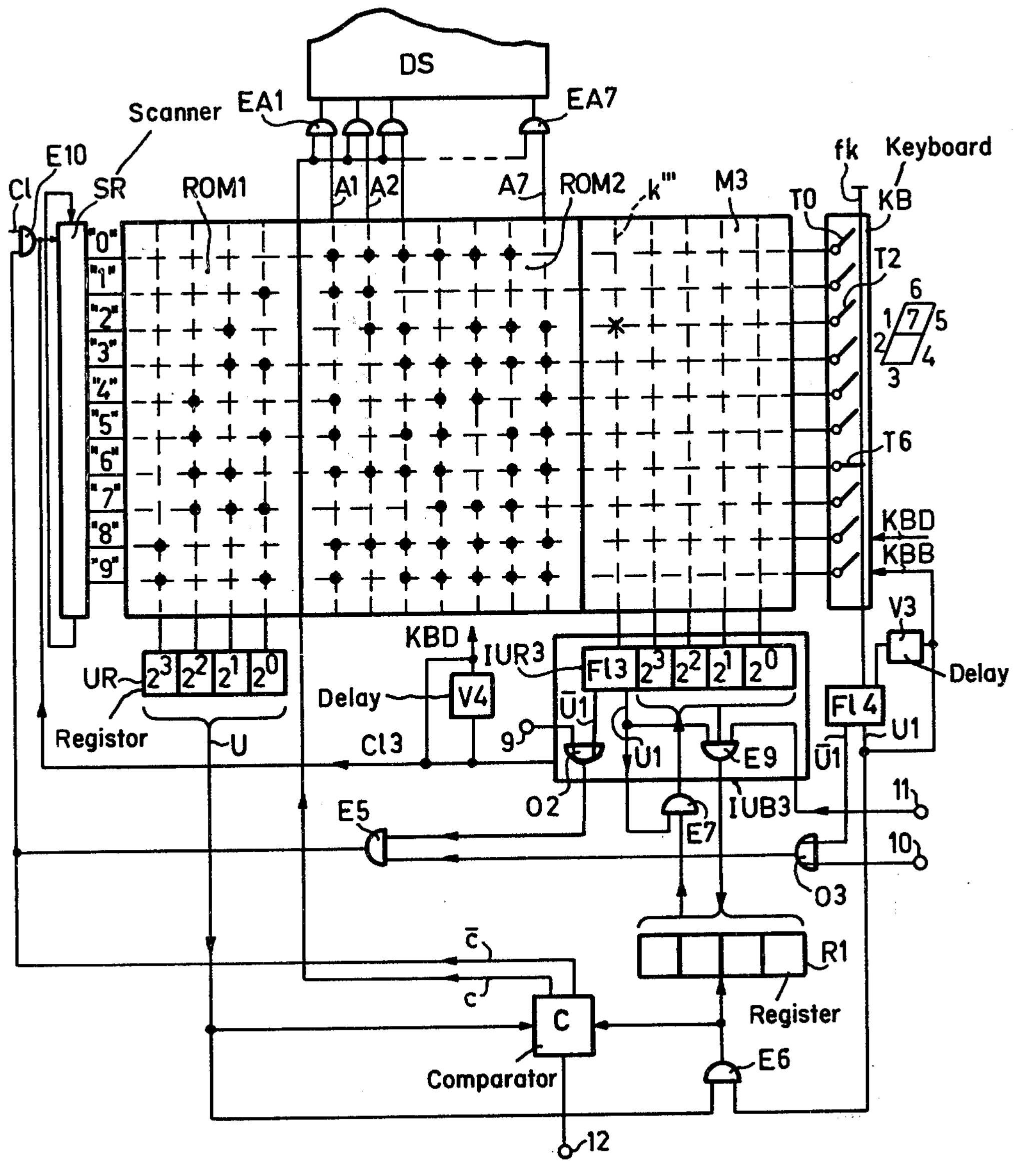

FIG. 7 shows a storage device according to the invention, comprising different kinds of storage section.

Figure 8:
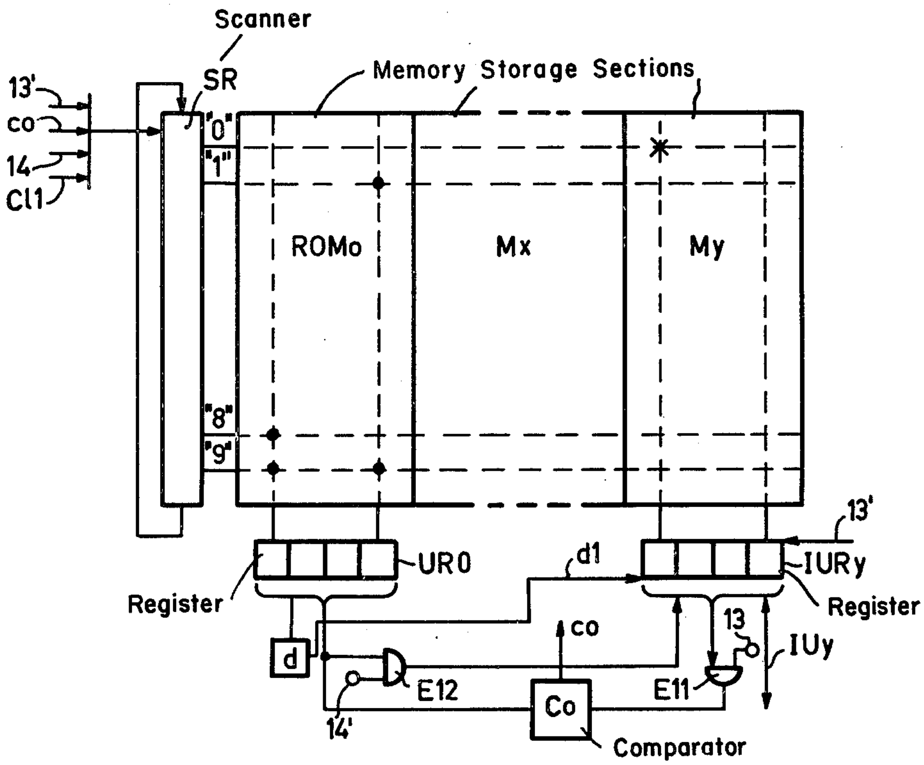

FIG. 8 shows a storage device according to the invention utilizing other storage means for an indicator.

Figure 9:
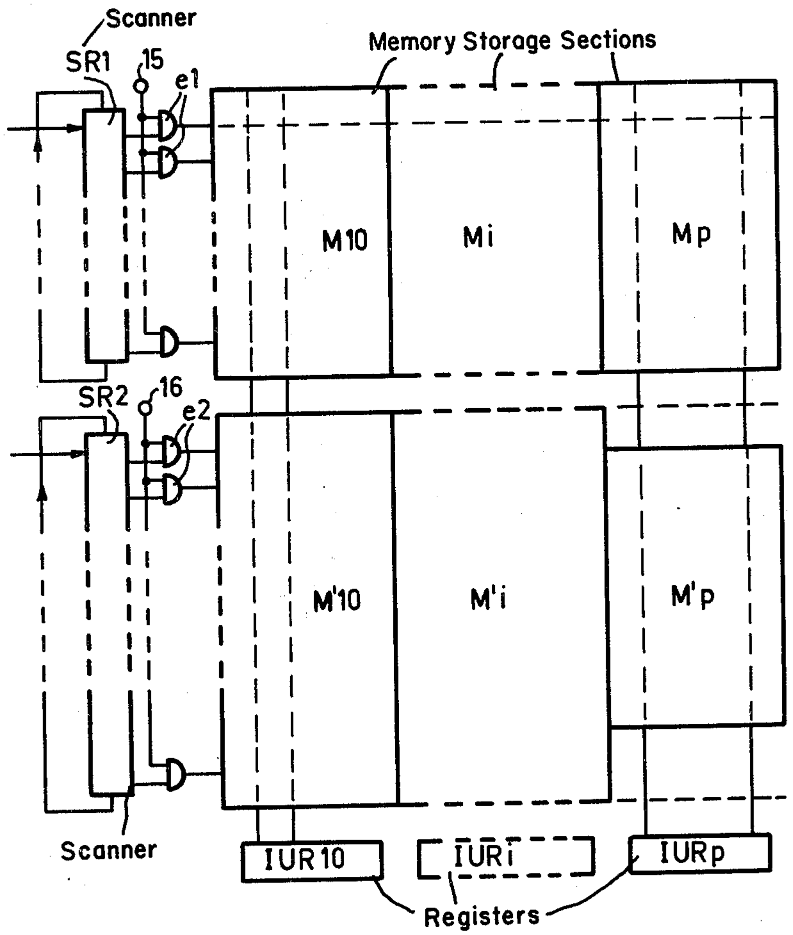

FIG. 9 shows a storage device according to the invention in which the scanner is sub-divided into a number of sub-scanners.

Figure 1:
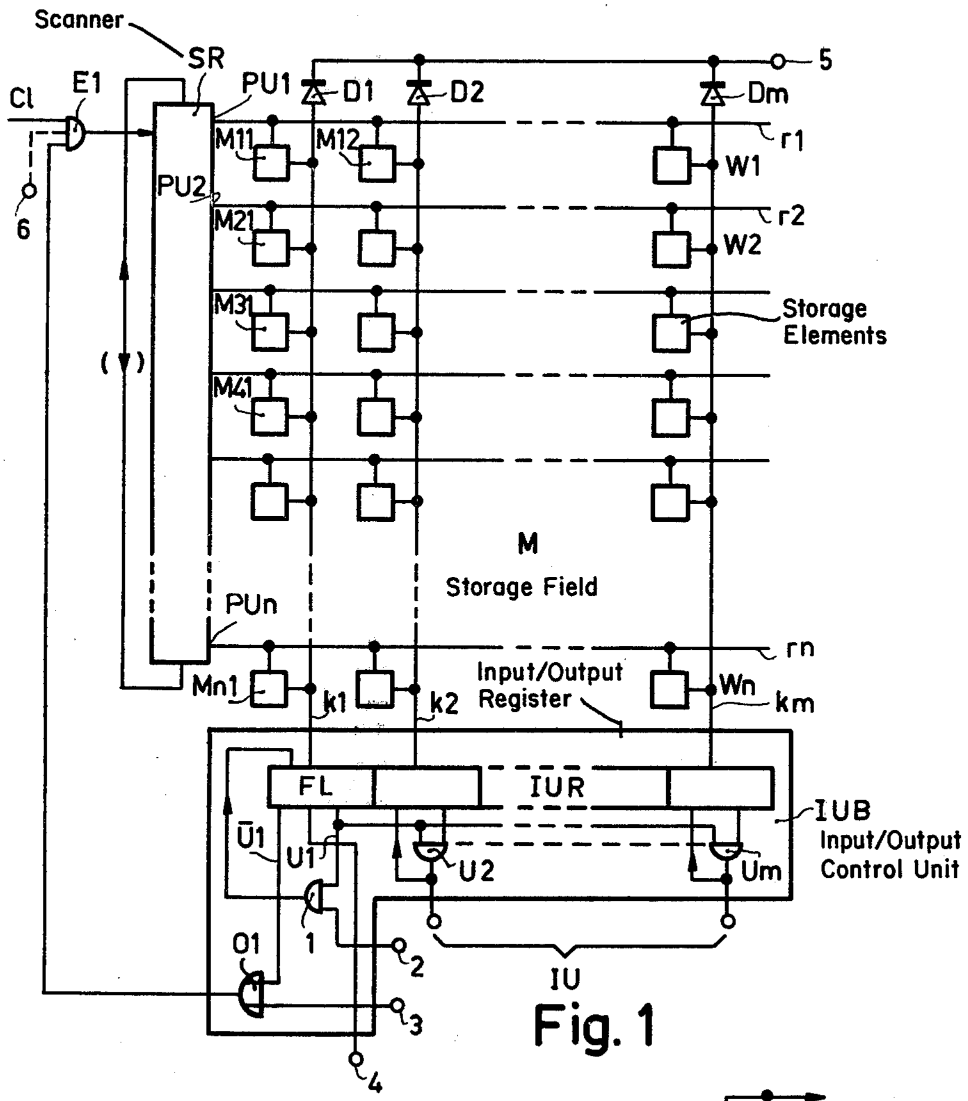
FIG. 1 shows the circuit diagram of the storage device according to the invention.

FIG. 1 shows the principle of the invention on the basis of a block diagram. Therein, M denotes a storage field of a store which is organized in a matrix according to rows *r*1, *r*2 . . . *rn* and columns *k*1, *k*2 . . . *kn*. *Per row a storage word W1, W2 . . . Wn* is present. The word information is stored in storage elements M11, M12, M13, . . . M1*m*, and M21, M22 . . . M2*m* etc., respectively, up to M*n*1, M*n*2 . . . M*nm*. These storage elements M*ij* are situated at the crosspoints of the rows *ri* and columns *kj*. The set-up shown is diagrammetic; more detailed embodiments are given in FIGS. 3 and 4.

The scanning register (scanner) is denoted by SR. This is a shift register which circulates under the influence of a clock pulse C1 and which carries a 1 in one position, the 1-valve being shifted through the register, the output of the register being connected to its input. For each shift position there is a position output PU1, PU2, . . . PU*n* which are connected to the relevant rows *r*1, *r*2 . . . *rn*. During the movement of the scanning register SR, all rows are thus successively passed through. If so desired for given applications, the scanning register can circulate both in the one and in the other direction. This is also indicated in FIG. 1.

The storage field M comprises, as shown here by way of example, an input/output control unit IUB, in which notably an input/output register IUR and AND-function gates 1, U2, . . . U*m* and an Or-function gate 01 are indicated. Also shown is an AND-function gate E1. D1, D2, . . . D*m* are diodes which are situated on the ends of the columns K1, . . . K*m* and which are connected to a common supply source terminal 5. The operation of this storage device according to the invention is as follows: The storage elements M11, M21, . . . M*n*1 are reserved for the storage of an indicator (flag) which provides the selection of a storage word in conjunction with a scanning register position.

Assume that there is a flag bit 1 in element M41. The scanning register SR starts at row *r*1 and indicates word W1 for selection. Element M11 does not contain a flag bit 1 (contents O) and in the register IUR~ a 0 is read in the flag location F1. This 0 produces a 1-signal the inverse of the flag bit on output $\overline{U1}$; this 1-signal reaches the AND-function gate E1 via OR-gate 01. The gate E1 is thus conditioned and allows passage of a next clock pulse via input C1. The scanner SR is thus advanced 1 step. Word W2 is indicated. Element M21 does not contain a flag bit either (contents 0) and the procedure is repeated. When the scanner position has become PU4, a 1-bit appears in F1 of IUR. Output $\overline{U1}$ then carries a 0-signal, and the AND-gate E1 is blocked. The scanner SR stops. Output U1 of F1 then carries a 1-signal and opens the AND-function gates U2, U3 . . . Um. The word information of word W4 thus appears on the output IU of IUR. Moreover, AND-gate 1 has been conditioned. A 1-signal or a 0-signal may be present on terminal 2 of a data processing device which is not shown and by which the storage device is controlled. Assume that a 0-signal is present. As a result, gate 1 remains closed. A restart pulse may then appear on terminal 3, which opens the AND-gate via OR-gate 01. The gate E1 thus allows passage of a next clock pulse, and the scanner SR advances again in its search for a next word whose flag bit is 1.

If a storage word has been selected as described above and appears on output IU, it can be ensured, depending on the kind of storage elements M*ij*, that the information remains stored in the relevant word, or that it is written in again. This is effected by known techniques for which the necessary provisions must be made in the input/output control unit IUB. For the writing of new information, a connection is made in UIB from the output IU, which now serves as input, back to the register IUR. Similarly, the contents of the flag bit can be changed via the terminal 4. When a word (W4) has been read, it may be desirable to change its flag bit from 1 to 0, so that this word will not be selected during the next circulation of the scanner. After modification, a restart pulse across input 3 ensures further advancing of the scanner SR. On the other hand, it is also indicated in this example that the flag bit is automatically changed from 1 to 0 after selection of a word. For this purpose, a 1-signal must be present on terminal 2. The AND-gate 1 is thus conditioned. If the AND-gate 1 is also conditioned by a 1-bit in F1 via output $\overline{U1}$, this 1-bit is returned to F1 where it changes the flag bit to 0 again. If F1 is a flip-flop, this can thus be effected by resetting this flipflop via gate 1. The output U1 then becomes 1 again, and the scanner is automatically switched through. Consequently, in that case no separate restart pulse across input 3 is required.

Figure 2:
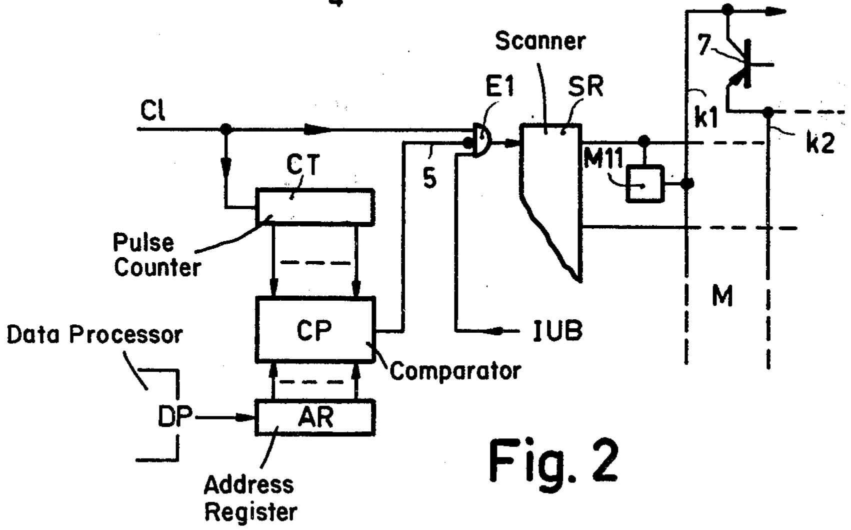
FIG. 2 shows a few elements which can be situated outside the storage device according to the invention.

For completeness' sake it is to be noted that for the practical use of the described storage device a terminal 6 is also provided for receiving an external release signal. For example, a data processing device which, when this store is used, supplies a 1-signal on terminal 6 in order to open the AND-gate E1 to allow passage of clock pulses in the various situations as described above. This terminal 6 can also serve, when a 0-signal is present thereon, to stop the scanner in an externally determined position. This is further elaborated in FIG. 2. Assume that in a data processing device DP a word W*i* is requested from the storage field M. W*i* is at a position *i*, or the address A*i* (in a code corresponding to this position). This address A*i* is supplied by an address register AR. The clock pulses for the scanner SR are counted in a pulse counter CT which counts in the same code as that of an address A*i*, and is subsequently compared with the address A*i* in a comparator CP. In the case of equality, a 1-signal appears on the output of CP. This signal appears in inverted form on AND-gate E1 and stops the scanner SR. The row *ri* indicated at this instant ensures that the word W*i* is available in IUR. A desired bit value, for example, 1 can now be imparted to the flag F1 of W*i* via terminal 4 (see FIG. 1).

For the filling in of the flag fields F1 in elements Mi1 it is possible to select only these elements instead of each time all elements of the words. For this purpose, the column K1 can be connected to the supply source terminal 5 via a separate conductor while the other columns *K*2 . . . *km* are connected to this terminal 4 via a separate switch 7. When the flag information is set, the switch 7 can remain open, so that the columns *k*2 . . . *km* are not connected to the supply source.

The following should be noted as regards the scanner SR. If use is made of integration techniques, this scanner may be a scanning shift register which is preferably provided on the same semiconductor body. Only one position has a 1-value, whilst the other positions have a 0-value. The 1-value circulates through the register under the control of clock pulses. This scannning register SR may be a bucket brigade register. Only very little semiconductor body surface area is then required. The scanning register SR can alternatively be a shift register composed of bi-stable elements. If such a scanning register is contructed to be shiftable in two directions, bidirectional travel along the rows and hence scanning is thus possible in a storage device according to the invention. A bucket brigade register which is shiftable in only one direction will have to be supplemented by a second bucket brigade register which shifts in the opposite direction in order to achieve by-directional shifting. The arrangement is then preferably such that such a bucket brigade register is arranged on both sides of the matrix in the row direction.

The foregoing description dealt with a number of aspects relating to a storage device according to the invention. This summary was not limitative. There are other ways of using this set-up. Hereinafter, a few further examples are given in this respect.

Figure 3:
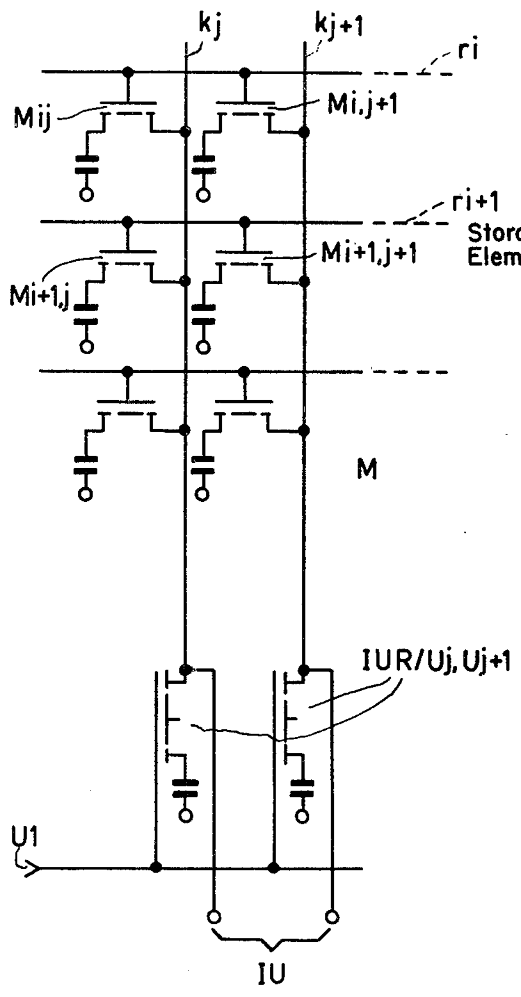
FIGS. 3 and 4 show embodiments of storage elements in a matrix of the storage device according to the invention.
Figure 4:
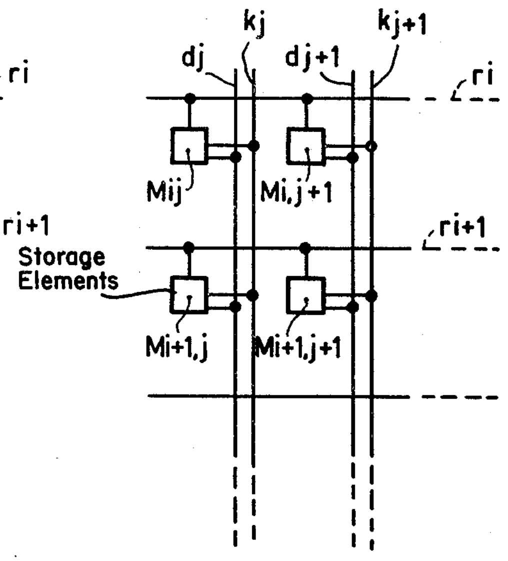

FIGS. 3 and 4 show, by way of example, two kinds of storage field M which can be used in the device according to the invention.

FIG. 3 shows a storage field M in which the elements on the crosspoints of the rows *ri* and *ri* + 1 and the columns *kj* + 1 shown here, i.e. M*ij*, M*i*, *j*+, M*i*+1, *j* and M*i*+1, *j*+1, are so-termed MOST cells. This is a dynamic store comprising one transistor per cell. The input/output IU of this storage field is also formed by MOST cells. The interconnection is activated herein by the line U1, originating from R1 (see FIG. 1), so that it appears that in the practical embodiment combinations of logic functions can be realized in an element. In this case: combination of input/output register IUR with the AND-gates U*j*, U*j*+1, etc.

FIG. 4 shows a general set-up of a storage field M comprising static elements M*ij* etc. Separate conductors, i.e. selection conductors which at the same time provide the power supply for the elements *kj*, *kj*+1, . . . . , and digit lines *dj*, *dj* +1, . . . via which the information transport takes place, are provided as columns. There are versions in which two digit lines are provided per column. It is to be noted that all feasible embodiments of storage elements, semiconductor cells as well as magnetic cells (cores, for example) etc. can be used, each kind requiring specific steps to be taken within the storage device.

FIG. 5 (*a* and *b*) shows a similar storage device with a different set-up of changing the indicator. The purpose is to obtain an operation in which after treatment of a given storage word W*i* each time the subsequent word W*i*+1 is dealt with. This requires the following procedure: assume that the scanner is at the position of row *ri;* assume that the flag bit of word W*i* is 1; word W*i* is selected and is treated in reaction to an external request (write or read); flag bit of W*i* becomes 0; scanner advances one position to row *ri* +1; the flag in row *ri*+1 becomes 1; word W*i*+1 is selected, etc. This is similar to the case where the storage field M is a complete shift register system. This means that each column represents a shift register and that all columns shift simultaneously, so that one word after the other appears on the output of the system.

FIG. 5*a* shows an arrangement for this set-up. Corresponding parts are denoted by the same references as in FIG. 1. Furthermore, there is a flipflop FF1 and an AND-gate E2 and two delay elements V1, V2. The clock input C1 with gate E1 has been replaced by line C11. The operation can be readily understood on the basis of FIG. 5b. Assuming that the flag bit is 0 (first line FIG. 5*b*) and that a pulse 1 appears on line C11; the scanner advances one step. The flag of the word then indicated by the scanner becomes 1 (via delay V2). The output U1 of F1 of the register IUR thus becomes 1. If the word thus selected is externally interrogated, a 1-signal appears on input 8 of AND-gate E2 for this purpose. The AND-gates U2, . . . U*m* (FIG. 1) are thus opened, and the interrogated word appears on the output IU, or information can be written in. At the same time the flipflop FF- is controlled via gate E2. This flip-flop changes its position, with the result that its output becomes 1. The flag field F1 of register IUR is controlled by this 1-signal. The flag present therein becomes 0. The output $\bar{U}1$ then carries a 1-signal, with the result that the flip-flop FF1 is switched over again, so that it output becomes 0 again. Meanwhile, the 1-position of FF1 has appeared on line C11 via the delay V1, with the result that the scanner is advanced one step. The next position is occupied, and the relevant row of the storage field M is indicated. Meanwhile. the said 1-position of the flip-flop FF1 has also been applied to F1 of register IUR via the delay V2. The flag of the word now indicated (i.e. the next word, as previously described) is thus made 1, and hence the relevant word is selected and can be interrogated by a 1-signal on input 8.

In FIG. 5$b$ this procedure can be followed by the arrows starting from F1 = 1 of a word indicated by the scanner.

FIG. 6 shows that the storage device according to the invention can also consist of a number of storage sections M0, M1 and M2. The scanner SR now serves for the indication of the rows $r1$, $r2$, . . . $rn$ which extend over all storage sections M0, M1 etc. At least one indicator per section can be associated with the storage sections M1, M2, with the exception of the section M0. As is shown, the first column $k'$ and $k'''$ of the storage sections M1 and M2, respectively, is reserved for this purpose. The processing and changing of these indicators (flags) of each of these sections M1 and M2 is effected in a manner corresponding to that described with reference to the FIGS. 1, 2 and 5. The means IUB1, IUB2, corresponding to the input/output control unit IUB (FIG. 1 or FIG. 5$a$) are provided. Flag bits of the words of a section (section word) M1, M2 are now detectable in F11 and F12, respectively, of the input-/output registers IUR1, IUR2. Depending on the indicators in the section words of M1 and M2, consequently, section words will be selected by the scanner SR from M1 and/or M2. The information transport for these section words is effected via the input/output terminals IU1 and IU2, respectively. The storage section M0 shown here, not having an indicator addition, in contrast with the other sections, but being coupled to the scanner SR, is in principle capable of realizing an information transport in each scanner position via columns which extend within this section. In FIG. 6 the AND-gate E3 is included to show that the stopping of the scanner SR can be effected by a signal from the input/output control unit IUB1 and/or IUB2. If a 1-signal is present on the line l1, and a 1-signal is present also on input 6, the AND-gate E1 is conditioned and the clock pulses applied to C1 are allowed to pass, with the result that the scanner SR advances. If a flag bit 1 is detected in one, or possibly in both input/output control units IUB1 and/or IUB2, AND-gate E3 closes and line l1 carries a 0-signal. The AND-gate E1 is then no longer continued, and the scanner SR stops. Information transport with the relevant section M1 and/or M$r$ and simultaneously with the section M0 can now take place. On the basis of the control in IUB1 and/or IUB2 (compare the description given with reference to FIG. 1), the scanner will be started again etc. The information transport to or from the storage device is effected via the terminals IU0, IUB1, IUB2 of the relevant storage sections M0, M1 and M2. It is obvious in the set-up described that, if for example a section word in section M1 is selected, this section word can be related to the corresponding section word of section MO without further selection activity within the store. This also applies to selection in M2, and also to simultaneous selection in M1 and M2. This means that section words can at random be treated and processed together. For example, a section word from M2 is transferred to the corresponding position in MO. This can be directly effected, but also after an operation has taken place. For example, section words from M1 and/or M2 can also be combined with section words from MO (for example, a logic AND or OR-combination) etc. The same applies in the other direction, i.e. from section MO to M1. In this way all sorts of transports of information within the storage device, with or without intermediate treatment or processing outside the device, are feasible. The "outside world" is symbolically denoted by DP which indicates a data processing device in which it is determined what is to take place. This device DP itself does not form the subject of the present invention, so it will not be elaborated herein. It is merely to be noted that input/output terminals IU1 and/or IU2 can be connected at random to the input/output terminals IUO and vice versa. It is also to be noted that the input 6, receiving a signal from DP, conditions, upon reception of a 1-signal as described above, the AND-gate E1 also with a 1-signal across L1. However, if a 0-signal appears on input 6, the following takes place: this signal conditions the AND-gate E4 by inversion, with the result that clock pulses are advanced to the scanner. The scanner SR can thus be operated completely independently of the internal situation in the storage device. Direct selection of the store section words from section MO is thus possible. The scanner can be stopped at an externally determined position. Compare, for example, the description given with reference to FIG. 1. It must be obvious from the foregoing that the said information transport from/to and between the different locations, notably the sections of the storage device, is possible by means of a very limited number of connections within the said store. If such a store is constructed according to an integrated circuit technique (for example, a semiconductor store), it is very important that the basic set-up of such a store can be followed as consistently as possible. This basic set-up is the matrix construction in this case. A semiconductor body comprising such a matrix structure, in which the store sections all fit on the said structure and in which they can still be independently used at random and in which the number of connections which deviate from the matrix pattern is limited, is a very attractive device in practice. The storage device, i.e. the sections including the scanner and the input/output registers IURO, IUR1, IUR2 with the control units IUB1, IUB2, will preferably be accommodated on a single semiconductor body.

It should also be noted that it is, of course, also possible to associate more than one indicator with a row. This is denoted in FIG. 6 by F1$i$ for storage section M1. It is thus possible that the selection in section M1 is not only possible on an indicator detected in Fl1, the said indicator being storable, for example, somewhere in column $k'$, but also on an indicator detected in F1$i$, the latter indicator being storable, for example, somewhere in column $k'$. In the absence of an indicator in Fl1′, $\bar{U}1'$ carries a 1-signal, whilst U1′ carries a 1-signal in the case of presence of an indicator in Fl1′. The fact in reaction to which of the indicators the scanner will be stopped can be externally determined at random. Additional AND-gates (not shown) can be incorporated in IUB1, either the outputs of Fl1 or the outputs of F1i or possibly even the outputs of the two flag fields being usable, via the said gates, for controlling the scanner.

FIG. 7 shows a storage device according to the invention, comprising storage sections of various kinds.

There are provided a first read-only section ROM2, a second read-only section ROM2 and furthermore a read-write section M3 and another storage section comprising only one column (flag column) fk which constitutes a keyboard KB. Also provided are a comparison device C and some other elements yet to be described.

A number of interesting operations can be performed using this set-up: keyboard scanning, writing in the value associated with a depressed key, and furthermore the conversion of a code (BCD) to a different code (7-segment code for display purposes). The BCD code is permanently stored in ROM1, i.e. from 0 to 9 in succession in the successive rows "0", "1" . . . "9" to be indicated by the scanner SR. A 7-segment code (see FIG. 7 at the right) is permanently stored in ROM2. If a row is indicated, for example "6", The BCD code for the digit 6, 0110, on this row in ROM2 will be converted into the 7-segment code 1111011, the said code appearing on the outputs A1, A2 . . . A7 via the relevant columns. From these outputs this code can be transported to a (digital) display not shown.

The operation of the above set-up will be described hereinafter, starting with the writing in section M3 of keyed-in data, followed by the conversion of the code of these data into a segment code for display.

The keyboard KB comprises a number (10) of keys TO, T1, T2, . . . T9, each of which is connected to a row of the matrix of the complete storage device. The keyboard KB further comprises a column fk, on which a 1-signal appears only if the scanner indicates the relevant row in the case of a depressed key. Assume that the key T6 is closed on row "6". The scanner SR is advanced by pulses C1 which are applied via AND-gate E10. E10 is conditioned by the fact that no flag is present in F14, so $\bar{U}1$ of F14 carries a 1-signal, and that furthermore an external 0-signal is applied to terminal 10 during the scanning of the keyboard KB. This terminal is connected, together with $\bar{U}1$ of F14, to an OR-gate 03. During the scanning of the keyboard, the effect of the flag in F13 of IUR3 is cancelled by a 1-signal on terminal 9. This 1-signal ensures that, independent of the flag contents of F13 a 1-signal is always applied, via OR-gate 02, from control unit IUB3 to AND-gate E5. Therefore, as long as $\bar{U}1$ of F14 carries a 1-signal, the scanner advances. If row "6" is indicated, the scanner there encounters the closed key T6. A selection has thus been effected, and column *fk* carries a 1-signal. As a result, the flag bit in F14 becomes 1, i.e. U1 = 1. $\bar{U}1$ becomes 0, and the advancing of the scanner SR is thus prevented via E8, E5 and E10. Using U1 of F14 = 1, the keyboard is blocked across the input KBB and, moreover, AND-gate E6 is conditioned. The stopped scanner indicates the BCD code on row "6" in section ROM1 for the digit "6". As a result, this code appears in the output register UR. The contents thereof arrive in the register R1 via the already conditioned gate E6. At this instant the F14 contents become 0 again via the delay V3 by U1 = 1 of F14.

Subsequently, the contents of the register R1 are transfered to a location in section M3. This location is indicated by an indicator on the relevant row. The successive locations (rows) of section M3 are then filled by the input of digits from the keyboard KB. This is effected as follows (compare for further details also FIG. 5 with associated description). A signal for continuously maintaining $\bar{U}1$ = 1 of F13, independent of the flag in F13, is no longer applied to terminal 9. However, a 1-signal is now applied to terminal 10 to ensure that the contents of F14 have no effect during the procedure now taking place. The scanner SR advances again (E5 receives an 1-signal on both inputs as long as F13 supplies a 1-signal on $\bar{U}1$). As soon as the scanner reaches the row in which the flag is situated in M3, for example, in row "2" and in connection with column *k'''* (flag column of M3), it comes in F13 so that $\bar{U}1$ of F13 becomes 0, so that the scanner stops. $\bar{U}1$ of F13 is now 1, and thus opens AND-gate E7, with the result that the contents of register R2 are transferred to input-/output register IUR3. From there, the contents (in this example, the digit 6) are transferred to M3 on row "2".

Because a subsequent digit must be placed in the next row "3" (see above), the flag in F13 must be erased, the scanner must advance one step, and the flag must be made equal to 1 for the said row "3". This is effected in the same manner as already described with reference to FIG. 5. C13 in FIG. 7 is the line which is denoted as C11 in FIG. 5. Subsequently, the keyboard KB is released again via delay V4: KDB output of V4 to KB. Moreover, this signal starts (via line C13) the scanner, SR again. A subsequent scanning of the keyboard can then commence.

When M3 has been filled, or it is externally determined in some other manner that M3 need not be filled further, the information in M3 can be further treated or processed.

Assume that in this example the information in M3 is displayed on display means utilizing a 7-segment code. Using the device according to the invention, this can be readily realized by using the matrix set-up of the storage device driven by the scanner. Storage section ROM2 contains the 7-segment code. The procedure is then as follows: the influence of F14 is cancelled by the 1-signal on terminal 10. The scanner SR advances until a flag = 1 appears in F13. For the first digit to be displayed this will occur on row "0" etc., each time one row further. During the display procedure a terminal 11 carries a 1-signal and conditions AND-gate E9. If F13 is filled with a flag 1, U1 = 1 and AND-gate E9 is open to allow passage of the information from IUR3 to register R1, and via this register this information becomes available to the comparison device C. The contents of register UR of section ROM1 are also applied to C. The influence of the flag in F13 is cancelled again by applying a 1 -signal to terminal 9; a 0-signal then appears on terminal 12, with the result that AND-gate E9 is closed. A command ordering comparison is then present on terminal 12: the contents of UR with R1. As long as there is inequality $\bar{C}$ = 1, with the result that the scanner continues to advance via gate E10. If there is equality, the scanner stops because $\bar{C}$ = 0. This means that a row of the matrix has been indicated whose code in the section ROM1 corresponds to the digit present in M3 on a row which is due to be displayed. Simultaneously, the corresponding 7-segment code is then selected in ROM2 on the same row. If a digit 6 were present on a location in M3 (for example, row "2"), the scanner is now in position "6", and the BCD code 0110 in ROM1 now finds the 7-segment code 1111011 on the row "6" in ROM2. This code is then accessible via the columns A1, . . . A7. Because the C-output of C carries a 1-signal, the group of AND-gates EA1, . . . EA7 is then conditioned and the code appears on the output. From this output the code can be applied to a display device DS. The described procedure can be displayed in successive locations of the display device.

It is to be noted that the described procedures and other feasible procedures for information transport and processing in the storage device according to the invention are usually controlled in practice by a control centre of a data processing device. The application of the derived signals to the various terminals, for example, 9, 10, 11, 12 of FIG. 7, and also the introduction of the desired delays, for example, denoted in FIG. 7 by V3 and V4, will then be completely looked after by such a control center. These are routines, or subroutines, which are run and in which the microprograms, usually permanently stored in read-only stores, supply the relevant patterns of command signals for control.

FIG. 8 shows a device according to the invention in which, in contrast with the preceding examples, an indicator is not stored as a flag bit in a specially reserved column, but in which the indicator of a row to be selected is accommodated in a section word itself within a given storage section. This indicator will then consist of the number of the relevant row to be selected. This saves one matrix column. There is usually space available for the storage in a given section word.

In FIG. 8 the storage device according to the invention comprises, by way of examle, three storage sections. ROMO is a read-only section, M*x* is a section which is not further shown, and M*y* is a write-read section. The scanner is again denoted by SR. UR*o* and IUR*y* registers, *d* is a 0-detector, C*o* is a comparison device, and E11 and E12 are AND-gates.

Assume that in My "0" is reserved in the 0th row for the storage of the flag data (indicator). The section comprises four storage elements in this case. For example, a digit having the BCD code can be stored. Assume that the number of rows is 10, i.e. "0" to "9". The flag value may be one of these digits 0 to 9, by means of which it can be indicated which row is to be selected during a next access to this section M*y*. Using this method of indicator storage, the operation is as follows: assume that in row "0" of My the code 1000 is present. Therefore, a next selection from My should be effected on row "8". Assume that the scanner starts at position "0". The 1000 code is read from M*y* and is applied to register IUR*y*. A 1-signal on terminal 13 AND-gate E11 conditions this gate and the information in IUR*y* becomes available in comparison device C*o*. At the same time, the contents of UR*o* are also present in C*o*. The contents of UR*o* are the code 0000, so there is no equality. A command 13' applied to SR initiates the advancing of the scanner SR. Command 13' also ensures that the contents of UR*y* are no longer changed from M*y*. In position "8" the code 1000 is written in UR*o*, and the detection of equality with the contents of IUR*y* takes place. A command C*o* thus becomes available which stops the scanner. The desired row "8" of section My can be treated as desired. Command 13' disappears and this section word can be read and/or written to and from, respectively, the output IU*y* via IUR*y*. The scanner can be started again in reaction to a command 14. In this example it advances one step to the "9" position. The code thereof, 1001, appears in UR*o* and, in reaction to command 14', applied to gate E12, this code is placed in register IUR*y*. A new command 13' starts the scanner again and again prevents contents modification of IUR*y*. When the scanner reaches the "0"-position, this is detected in *d*. This results in the command *d*1, by means of which the scanner is stopped again. This command *d*1 also ensures that the contents of IUR*y* are taken up in section M*y*. These contents ("9") are thus stored in the "0"-row of section M*y* and form the new indicator.

If this method of indicator storage were used in the embodiment described with reference to FIG. 7, the comparison device C already present therein could also be utilized for the described comparison of the indicator with the contents of register UR*o*. In this way no additional comparison device is required.

FIG. 9 shows that in the storage device according to the invention the scanner arranged in the column direction need not only be a single scanner. The scanner may be sub-divided into a number of sub-scanners SR1 and SR2. Each scanner treats the rows of the storage matrix in front of which it is arranged. For example, various storage sections are thus possible in the column direction of the matrix: M1*o* and M'1*o* and in the transverse direction M*i* and in the column direction M'*i*, and in this case also M*p* and M'*p*. In this example input/output registers are provided for all rows in common per group of columns. For example, IUR10 for sections M10 and M'10, IUR*i* for sections M*i* and M'*i*, and IUR*p* for sections M*p* and M'*p*. Using this arrangement, the possibility of information transport from and to the various locations of the matrix and vice versa is still further extended, without a variety of additional connections being required for this purpose. The information transport can be effected in any given manner using the indicators.

All means and procedures used in the examples described above are usable. For example, a section word of M'*p*, assigned for this purpose by an indicator in M'*p* and selected at a position of scanner SR2, can be written, via its input/output register IUR*p*, with or without a treatment, as desired, in a section word of, for example, section M10 which is selected at a position of scanner SR1. If M10 is a read-only store, a comparison can be made again as described above etc. Because the columns continue in the matrix, it is necessary that, when rows are being scanned by a sub-scanner, no rows can be scanned by another sub-scanner, as there would otherwise be a mix up between the information from different sections in the column direction. This is indicated by the AND-gate *e*1 and *e*2 in FIG. 9. If scanner SR1 is active, a 1-signal is present on terminal 15 and the gates *e*1 on the output of the scanner SR1 are conditioned. At the same time, terminal 16 carries a 0-signal, with the result that the gates *e*2 remain closed. Thus, a given position of SR2 does not give an indication of an associated row. If SR2 is active, the reverse is applicable. The described "disconnection" of storage sections connected to a non-active sub-scanner can also be performed by switching off the power supply of the relevant sections by way of a switch. For this purpose, however, the supply lines to the groups of sections must then be interrupted.

What is claimed is:

1. A storage device cmprising a plurality of information storage elements organized as a matrix of conductive rows and columns;

at least one flag storage element in each of said rows of said matrix for indicating an external flagged condition;

a scanning register having a plurality of outputs each connected to a respective row conductor for scanning said flag storage elements in each of said rows, and being operatively responsive to said flagged condition in one of said flag storage elements; and data transfer means for effecting the transfer of at least some of the stored information in said information storage elements in response to a transfer command.

2. A storage device as defined in claim 1, further comprising means for changing the contents of said flag storage elements in response to an external command.

3. A storage device as defined in claim 1, wherein said flag storage elements comprise at least part of a predetermined column of said matrix.

4. A storage device as defined in claim 1, wherein said storage elements are constructed as an integrated circuit.

5. A storage device as defined in claim 1, said scanning register is operatively responsive to said flagged condition for issuing a transfer command to said data transfer means for effecting the transfer of stored information in said respective row.

6. A storage device as defined in claim 1, further comprising means for advancing said scanning register after said scanning register has indicated an external flag condition.

7. A storage device comprising a plurality of information storage elements organized as a matrix of conductive rows and columns, said storage elements forming at least two distinct storage sections in the row direction, each containing at least one section word;

at least one flag storage element in each of said rows of said matrix for indicating an external flagged condition;

a scanning register having a plurality of outputs each connected to a respective row conductor for scanning said flag storage elements in each of said rows, and being operatively responsive to said flagged condition in one of said flag storage elements; and data transfer means for effecting the transfer of at least some of the stored information in one of said storage sections in response to a transfer command.

8. A storage device as defined in claim 7, wherein one of said storage sections is read-only type, and the other of said storage sections is read-write type.

9. A storage device as defined in claim 7, wherein one of said storage sections is a keyboard input, each key corresponding to a particular column and row of said matrix.

10. A storage device as defined in claim 7, further comprising means for comparing the contents of a first section word from one of said storage sections with a second section word from another of said sections.

11. A storage device as defined in claim 10, comprising first and second storage sections, including means for storing an indicator, wherein said section words on one of said rows contain different codes, and wherein, if said comparison means determines an equality between a section word of said first storage section and a section word section, the corresponding code section word of said second storage sections is transferred to said data transfer means.

12. A storage device as defined in claim 7 wherein said scanning register comprises a plurality of sub-scanners in the column direction, each of said sub-scanner having a rest and an active state, and being associated with at least one of said storage sections, and further comprising means for preventing the outputs of ones of said sub-scanners in said rest state from being connected to respective ones of said rows.

13. A storage device as defined in claim 7, further comprising a plurality of indicators associated with each of said rows and means for detecting respective ones of said indicators, wherein the scanning register is stoppable after detection of one of said indicators.

* * * * *

UNITED STATES PATENT AND TRADEMARK OFFICE

CERTIFICATE OF CORRECTION

PATENT NO. : 3,927,396

DATED : December 16, 1975

INVENTOR(S) : CLAUDE JAN PRINCIPE FREDERIC LE CAN

It is certified that error appears in the above-identified patent and that said Letters Patent are hereby corrected as shown below:

Column 1, line 27, "prises" should be --prising-- line 36, "offer" should be --offers--

Column 2, line 57, "key-board" should be --keyboard--

Column 4, line 31, "O" (letter) should be --0-- (zero)

Column 5, line 11, "Ul" should be --$\bar{U}$l-- line 43, "K" should be --k-- line 57, "bi-stable" should be --bistable--

Column 6, line 65, "FF-" should be --FF1--

Column 7, line 24, "K'''" should be --K''--

Column 11, line 30, after "IURy" insert --are--

Signed and Sealed this

Thirteenth Day of July 1976

[SEAL]

*Attest:*

RUTH C. MASON
*Attesting Officer*

C. MARSHALL DANN
*Commissioner of Patents and Trademarks*